Figure 5:
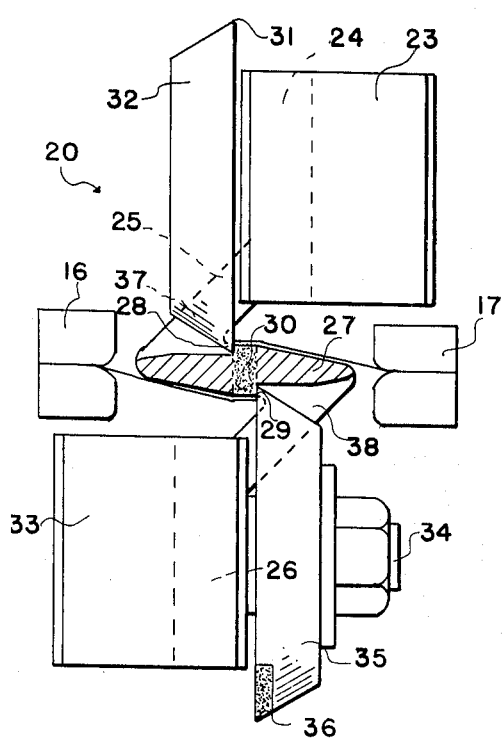

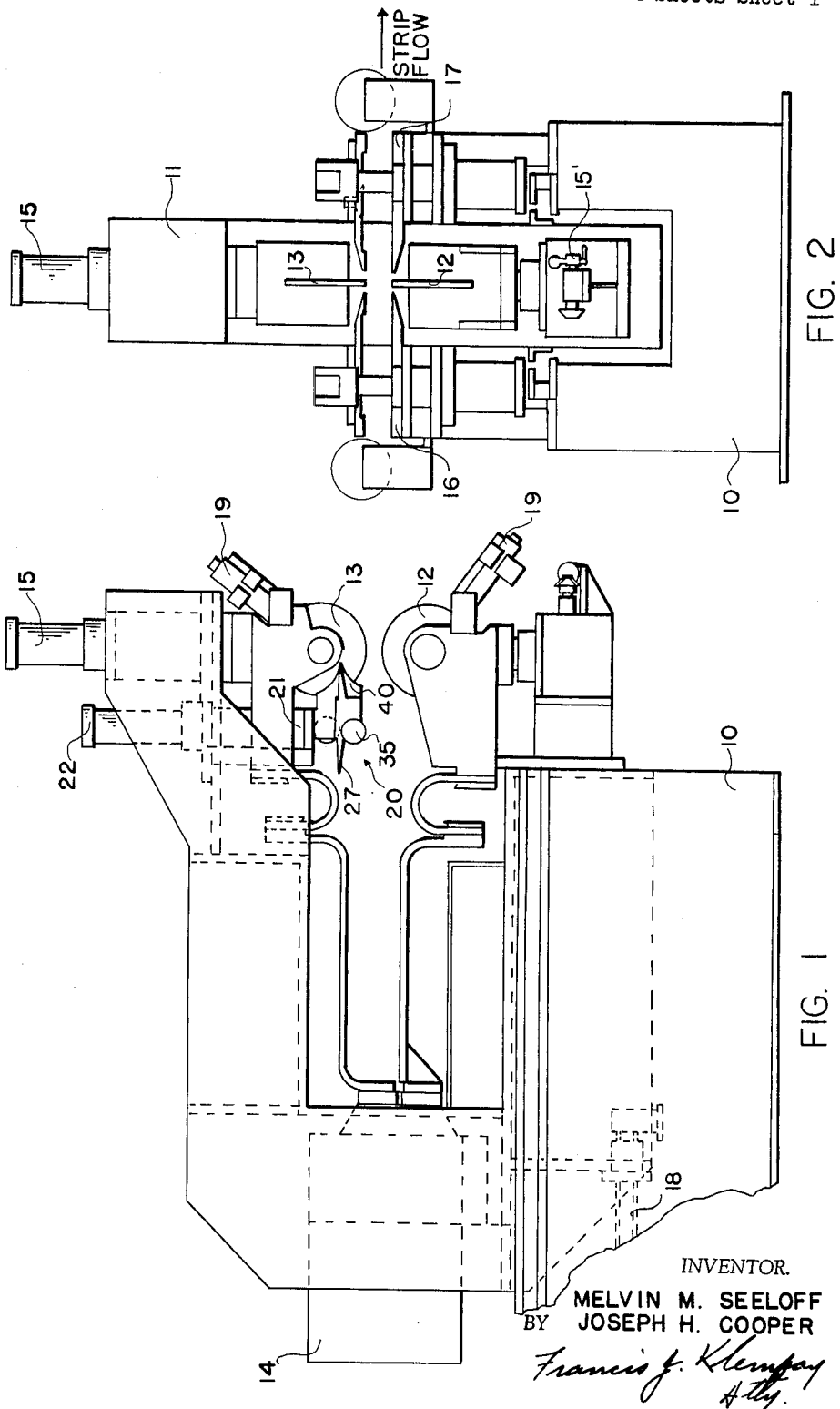

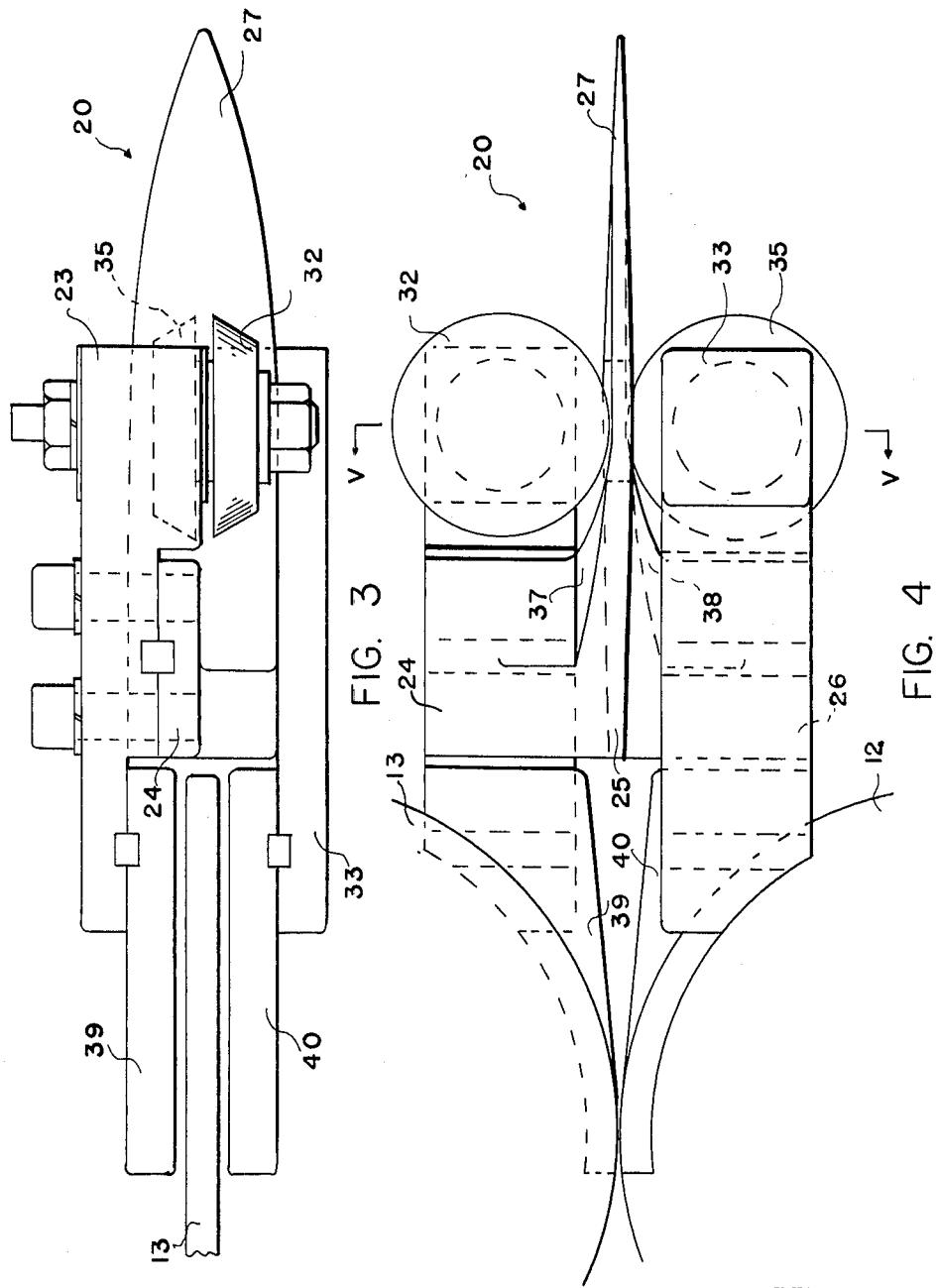

Feb. 15, 1966    M. M. SEELOFF ETAL    3,235,703
APPARATUS FOR JOINING STRIP
Filed Nov. 23, 1962    4 Sheets-Sheet 3

INVENTOR.
MELVIN M. SEELOFF
BY JOSEPH H. COOPER

United States Patent Office 3,235,703
Patented Feb. 15, 1966

3,235,703
APPARATUS FOR JOINING STRIP
Melvin M. Seeloff and Joseph H. Cooper, Warren, Ohio, assignors to The Taylor-Winfield Corporation, Warren, Ohio, a corporation of Ohio
Filed Nov. 23, 1962, Ser. No. 239,626
12 Claims. (Cl. 219—82)

This invention relates to an improved method and apparatus for joining metal sheets and strip wherein the workpieces are attached to each other in generally flat relation. Thus, the invention has particular utility in the joining of strip lengths in general end-to-end relation for the production of continuous strip to be fed to pickling, annealing, and other processing and/or utilization lines wherein it is desired that the strip be furnished in a continuous and uninterrupted length. Improved processes and apparatus for such lines have greatly improved the quality of the final product therefrom and have greatly increased the rate of production, necessitating supply equipment in the form of strip joining apparatus which is operative at higher rates of speed and which is capable of effecting uniformly consistent high quality welds in the joining of the strip. It is the primary object of this invention to provide an improved method and apparatus for accomplishing these end results.

For furnishing continuous strip for most processing and/or utilization lines it has been determined from experience that the best overall results are obtained by mash-seam welding slightly overlapped trailing and leading edges of the successive discrete strip lengths. This is accomplished, as in U.S. Patent No. 2,957,071, by accurately shearing the tail ends and the leading ends of the successive strip lengths preparatory to overlapping and welding. In the apparatus of said patent the required consistency and accuracy of the overlap as well as the optimum conditioning of the edges for mash-seam welding is accomplished by first securing the tail end portions and head end portions of the strip lengths in accurately related clamps after which the contiguous end extremities of the lengths are sheared, and while the lengths remain secured in the clamps one of the clamps is tilted upwardly and advanced a predetermined distance toward the other to effect the desired overlap. Thereafter, the seam welding wheels, which are preferably carried by the same movable frame as the shear, are moved into welding engagement with the work. In this method the welding phase of the joining cycle cannot be started before the shear elements are retracted from the work and the movable clamp is manipulated to effect the overlap in the stock as explained. Further, the required apparatus is somewhat complicated in that provision must be made for very accurately guiding the longitudinal movement of the movable clamp while yet providing for the tilting motion of this clamp. The present invention overcomes both these objections and by eliminating the time required to retract the shear elements and overlap the workpieces actual welding may be started much earlier in the joining cycle to thereby materially decrease the time required for completion of this cycle. Also, the strip clamps may now be made much simpler, more rugged, fixed relative to each other, and less expensive.

The above objects are accomplished by the present invention by positioning a traveling shear immediately ahead of the mash-seam welding wheels for the purpose of shearing, conditioning, and accurately overlapping the strip edges to be welded together immediately ahead of the wheels as the wheels move transversely across the strip. This shearing and overlapping unit is especially constructed for the purpose although being capable of varying specific design as will be hereinafter explained. It may be conveniently carried by the same transversely movable support which mounts the seam welding wheels so that thereby the complete joining machine may be made quite compact and simple. The unit is capable of separating (vertically) the two roughly overlapped strip lengths while the same remain secured in the welded clamps of the apparatus and of shearing the lengths separately in an offset manner so that after passage of the unit the sheared end extremities of the lengths can be gradually brought back again into contact with each other and in precisely overlapped condition for engagement by the welding wheels.

A further object of the invention is the provision in combined apparatus having the characteristics outlined above of an arrangement whereby the extent of stock overlap presented to the seam welding wheels may be readily and precisely varied to suit the requirements of the particular stock being handled or varying requirements of the strip processing and/or utilization line with which the combined apparatus may be used.

The above and other objects and advantages of the invention will become apparent upon consideration of the following specification and the accompanying drawing wherein there is disclosed certain preferred embodiments of the invention.

Figure 6:
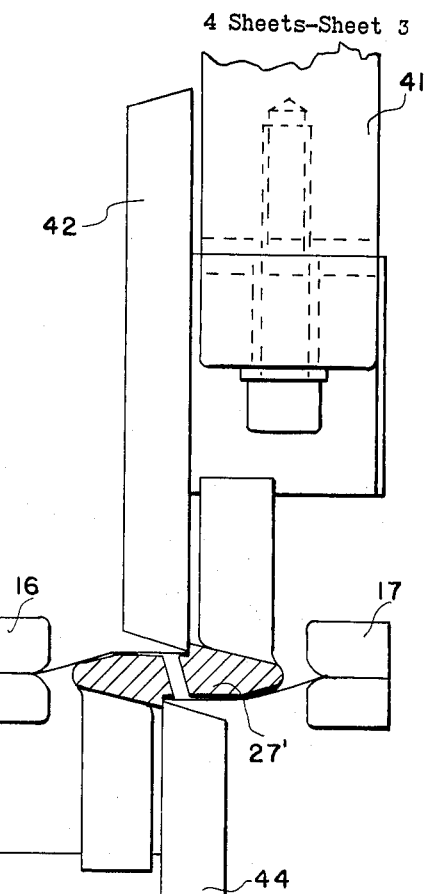
Figure 10:
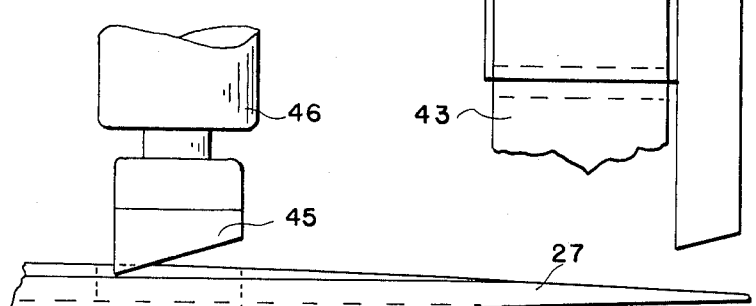
Figure 9:
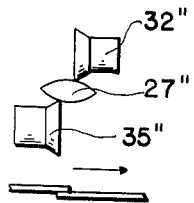
Figure 8:
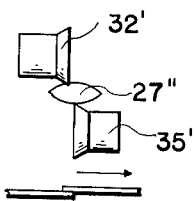
Figure 7:
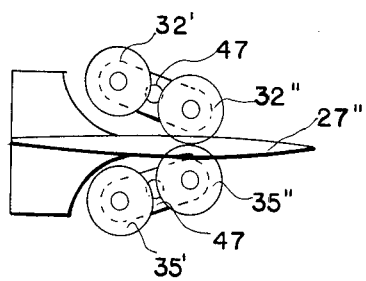
Figure 11:
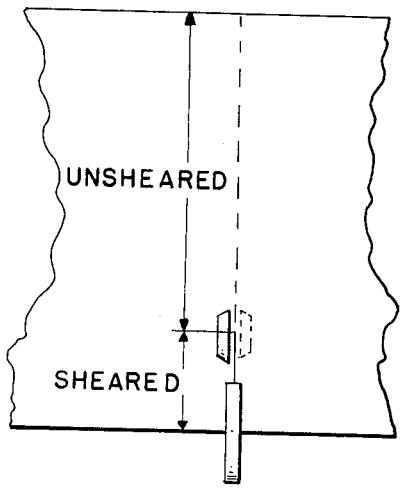
Figure 12:
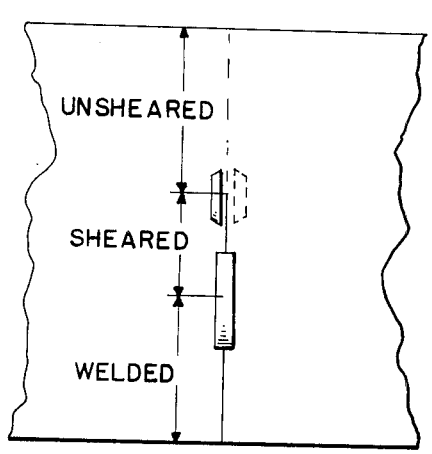
Figure 13:
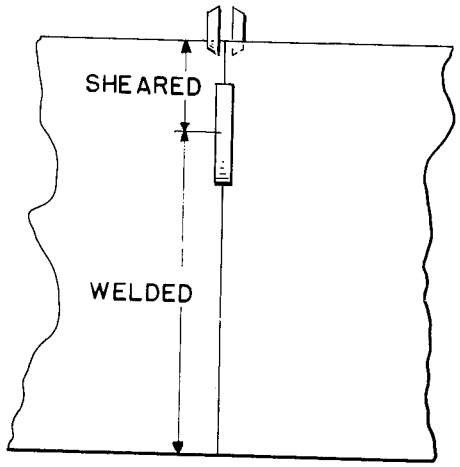

In the drawing:
FIGURE 1 is a fragmentary side elevation of a strip splicing machine constructed in accordance with the principles of the invention;
FIGURE 2 is an end view of the machine of FIGURE 1;
FIGURE 3 is a plan view of the shearing and overlapping unit utilized in the assembly of FIGURES 1 and 2;
FIGURE 4 is a side elevation of the assembly of FIGURE 3;
FIGURE 5 is a sectional view taken along the line V—V of FIGURE 4;
FIGURE 6 is a view similar to FIGURE 5 of a modified form of shearing and overlapping unit constructed according to the principles of the invention;
FIGURE 7 is a schematic showing of a further modified form of the shearing and overlapping unit;
FIGURES 8 and 9 are schematic showings of the alternate uses of the apparatus of FIGURE 7;
FIGURE 10 is a fragmentary view similar to FIGURE 4 of a further modified form of the invention; and
FIGURES 11, 12 and 13 are schematic showings of the mode of use of the apparatus of the invention and of the joining method effected thereby.

In FIGURES 1 and 2, reference numeral 10 designates a fixed base on which is slideably mounted a C-shaped frame 11 carrying at its outer free ends a lower seam welding wheel 12 and an upper seam welding wheel 13. These welding wheels or electrodes are rotatably mounted on current-conductive carriers which are connected to the output terminals of a welding transformer 14 which is also mounted on the frame 11. In accordance with known practice, the carrier for the lower wheel 12 is vertically adjustable by a crank 15' acting through suitable gearing, not shown, to compensate for wear reduction in the diameter of wheel 12 to thus keep the welding plane at the same elevation. The carrier for the upper wheel 13 is suitably guided for vertical movement which is effected by a cylinder 15. This cylinder 15 is also utilized to exert the proper welding force between the rotary electrodes 12 and 13 as the latter move over the overlapped stock ends to be welded together.

Rigidly mounted on the base 10 but free and clear of the frame 11 and parts carried thereby is an entry stock clamp 16 and an exit stock clamp 17, and while these are not shown on FIGURE 1 it will be understood that these clamps are of sufficient width to receive any stock which will be joined by the particular apparatus and to firmly secure this stock throughout its entire width. Suitable means, comprised in part of the screw 18, is provided to move the frame 11 on the base 10 when effecting a joining cycle of the sheet or strip pieces to be joined and while these pieces are secured in the clamps 16 and 17. Also, as is known in the art, each of the carriers for the electrodes 12 and 13 mounts a pneumatic reciprocating hammer 19 for the purpose of continuously conditioning the peripheral edges of the electrode wheels as the seam welding progresses. It will be understood that in overlapped mash-seam welding the peripheral surfaces of the wheel electrodes ride directly on the edges of the workpieces which edges are sharpened by the shearing and therefore have a deleterious effect on the wheel electrodes. The damage is continuously repaired by the hammers 19.

Referring further to FIGURE 1, reference numeral 20 refers generally to the strip shearing and overlapping unit of my invention which unit is rigidly carried by the lower end of a quill 21 suitably guided for vertical sliding movement in the frame 11 adjacent to the upper electrode wheel 13. The quill 21 and consequently the unit 20 is arranged to be raised and lowered by a cylinder 22 also carried on the frame 11. The construction and operation of the unit 20 will now be described in detail in connection with FIGURES 3, 4 and 5.

Referring now to FIGURE 3, reference numeral 23 is a vertically disposed support which may be integral with or rigidly attached to the bottom end of the quill 21 and which forms the carrier for the shearing and overlapping assembly now to be described. Rigidly secured and keyed to this carrier 23 is the upper vertically disposed pad 24 of an odd shaped member having a vertically intermediate Z-shaped section 25 and a lower vertically disposed pad 26 which is offset with respect to the upper pad 24 as shown in FIGURE 5. Integral with and extending outwardly from, in cantilevering fashion, from the Z-shaped section 25 is a saber-like anvil 27, the function of which will be hereinafter described.

As shown in FIGURES 3 and 5 the anvil 27, aside from being tapered both in plan and longitudinal elevation is also generally flat in transverse cross section. Further, the diagonally opposite side portions of the top and bottom surfaces of this anvil are rabbeted in a longitudinal direction to provide an upper cutting edge 28 and a lower cutting edge 29 which lie in offset vertical planes as shown in FIGURE 5. The entire integral assembly of the portions 24-27 is carefully made of high quality tool steel so that the cutting edges 28 and 29 may be an integral part of this member. However, to provide a much longer-lasting shear I propose to lance in an intermediate portion of the anvil 27 and to braze within this opening a small block of sintered metal carbide 30 to provide the cutting edges 28 and 29 in a manner well understood in the toolmaking art. Coacting with the cutting edge 28 is the annular cutting edge 31 of a rotary shear blade 32 which is rigidly carried by a spindle anti-frictionally mounted in the carrier 23. The mounting for the spindle is such that no end-play whatsoever is permitted, and by means of shim washers and the like the plane of the cutting edge 31 may be precisely determined and held to provide proper shearing clearance with respect to the shearing edge 28.

Rigidly secured to the lower pad 26 of the anvil assembly is a block 33 which journals a spindle 34 for mounting the lower rotary shear blade 35. Blade 35 is adjustable mounted on the spindle 34 to provide proper shearing clearance between its cutting edge 36 and the cutting edge 29 of the anvil 27. As indicated in FIGURE 5, this cutting edge 36 may be formed of a ring of sintered metal carbide which is brazed into an annular recess cut in the body of the roll 35. Rotary knife 31, 32 may be similarly constructed.

As indicated in FIGURES 4 and 5 there is a plow-like transition surface 37 extending along the top outer edge of the Z-section 25 to the flat surface on anvil 27 at the base of the rabbet which provides cutting edge 28. A similar surface 38 extends along the lower strut of the Z-section. The function of this configuration will be described below in connection with the overall operation of the apparatus. Rigidly secured to and depending rearwardly from the carrier 23 and the block 33 and positioned on opposite sides of the welding electrode 13 is a pair of deflectors 39 and 40, respectively, the function of which will also be described hereinafter.

Considering now the operation of the apparatus described above and assuming that shear unit 20 and welding electrodes 12 and 13 are retracted as shown in FIGURE 1 the strip which has been running through the apparatus is stopped as the tail end thereof approaches the weld line and thereupon the exit clamp 17 is closed. Depending on the width of the strip, the frame 11 is now moved to the left, as viewed in FIGURE 1, to position the projecting free end of anvil 27 over an edge portion of this strip, the cylinder 22 being actuated to bring the anvil 27 down into overlying contact relation with the strip. The next succeeding strip length to be joined is then advanced into the apparatus until the head end thereof approaches or contacts the clamp 17, thus advancing the leading edge thereof well beyond the line of weld. In so feeding the new strip length suitable means, not particularly shown but well known in the art, may be employed to insure that the head end of the new strip is in vertical registry with the tail end of the old strip. Thus, a side edge portion of the new strip will overlie that portion of the anvil 27 which now rests on the old strip. Thereafter, the entry clamp 16 is closed and immediately the screw 18 may be actuated to begin the shearing and welding traverse. The tapered flat anvil 27 slides in between the two overlapped end portions of the workpieces and shearing of both the top and bottom workpieces begins as soon as the rotary knives 32 and 35 engage them—the cutting, of course, being done between edges 28 and 31 for the top strip and between edges 29 and 36 for the bottom strip. The resulting elongated croppings are then slidingly engaged by the plow-like transition surfaces 37 and 38 of the Z-section 35 and are curled up on edge to pass outside of the outer surfaces of the two deflector plates 39 and 40 and thus away from the welding wheels 12 and 13. Also, as shown in FIGURE 4, the bottom surface of upper plate 39 and the top surface of plate 40 converge toward each other in the direction of the welding throat between electrodes 13 and 12 so that the sheared stock is cammed into flat overlying relation or overlap and buckling of the edges is prevented.

As indicated in FIGURE 3, the lines of shear are within the projected path of travel of the welding wheels 12 and 13 so it should be obvious that as the two vertically offset end portions of the sheared strip lengths pass back beyond the Z-member 25 these overlapped end portions will begin to move together by reason of the cam surfaces on members 39 and 40 and of the clamping action provided by the welding wheels, it being understood that at this time the wheels will be brought together with proper welding pressure and be supplied with welding current from the transformer 14. Therefore, the seam welding begins as soon as the wheels 12 and 13 engage the side edge of the workpieces which have been properly sheared and overlapped by the unit 20 and the welding continues uninterruptedly during traverse of the assembly across the strip and until the wheels have run off the opposite side edge thereof. The speed of traverse may be quite rapid in joining thin stock, particularly, and it should therefore be noted that a joint in the strip may be completed in a very short period of time after the workpieces have been properly loaded into the combined apparatus. Suitable automatic sequence control, not shown herein, may be provided to further decrease the time required for the complete joining cycle by automatically stopping the running strip in proper position, by automatically positioning the frame 11 so that proper overlap of the anvil 27 is attained, and by providing for the rapid aligning and positioning of the new stock length, the quick closing of the clamps, and initiation of traversing movement of the frame 11 as soon as both clamps are closed.

Immediately upon completion of the welding traverse the line may be restarted to feed strip and during the running thereof through the apparatus the unit 20 and welding wheel 13 may be retracted and the frame 13 shuttled back to its initial starting position preparatory to making the next joint. This initial position of the frame 11 may be properly related to the strip width and to the position of the side guides therefor so that immediately upon the running strip being stopped the cylinder 22 may be actuated to cause the anvil 27 to properly overlie the side edge portion of the strip.

It should be observed that by simultaneously but separately shearing the two workpieces to be welded together the width of overlap which will subsequently be effected is precisely determined and will be absolutely uniform throughout the width of the strip. This makes for a high quality consistent end product which is highly desired in most strip processing and utilization lines. To vary the extent of overlap the anvil 27 may be interchanged to provide cutting edges 28 and 29 having different horizontal spacings. Of course, the horizontal spacing between the rotary knives 32 and 35 must be correspondingly varied, and this may be done either by interchanging the whole unit 20 or by re-shimming the knives on their arbors as will be apparent. Another advantage of the dual shearing is that the opposing vertical and horizontal shearing forces applied to the anvil 27 are counterbalanced one against the other so that there is no undue tendency of the anvil to twist or deflect. The configuration of the Z-section 25 is highly efficient in resisting the torque which does result from the offset nature of the shearing points. In actual practice the moment arm or arms causing this torque may be kept quite short. This torque effect is further minimized by the inherent tendency of each shear to impart both clockwise and counterclockwise forces to the anvil as viewed in FIGURE 5.

Another advantage of the combination of my invention, particularly the close coupling of the welder to the shear, is evident from a consideration of FIGURES 11, 12 and 13 which respectively show the relation of the apparatus parts to the strip at the start of welding, intermediate the side edges of the strip, and as the shear passes beyond the far edge of the strip. As the apparatus engages the near edge of the strip, as shown in FIGURE 11, any tendency of the strip ahead of the shear to buckle is resisted by the substantial lateral expanse of strip which is ahead of the shear and which at this time is firmly secured in the clamps 16 and 17. Later, as depicted in FIGURES 12 and 13, the rigid jointure of the strip behind the welder resists any buckling or other displacement of the strip in generally horizontal planes. Consequently, the longitudinal offset or parallelism of the sheared edges of the workpieces remains constant as does also the subsequent overlap of the workpieces prior to welding. In connection with the latter aspect it should be noted that the bottom surface of deflector 39 and the top surface of deflector 40 converge toward the welding plane between the wheel electrodes 12 and 13 to positively cam the overlap portions into close relationship with each other just prior to welding. These surfaces also act as anti-wrinkle or anti-buckle devices at the point of weld.

In the embodiment of the invention shown in FIGURE 6 the anvil 27' which corresponds in general to the anvil 27 of the first described embodiment is split longitudinally. One half of the anvil 27' is carried by an upper slide 41 which upper slide also rotatably mounts the upper rotary shear knife 42. The other half of anvil 27' is carried by a bottom slide 43 which also rotatably mounts the bottom shear knife 44. If should be understood that in a practical machine the slide 41 would be carried by the upper arm of the frame 11 above the strip pass plane therethrough while the lower slide 43 is carried by the lower arm of frame 11. Suitable actuating means, not shown, is provided to retract and advance the slides 41 and 43 and by making the slide guides adjustable as to position it is possible to readily vary the longitudinal spacing of the two lines of shear and thus to readily vary the overlap effected in the strip prior to welding. Since the upper and lower shearing units are entirely independent the retraction of them away from the strip pass plane enables the frame 11 to be moved back to its initial starting position while strip is running through the combined apparatus.

In the embodiment of the invention shown in FIGURE 10 the rotary shear knives (32, 35 in FIG. 4 or 42, 44 in FIG. 6) are replaced with raked shear blades 45 arranged to be actuated by reciprocating motors 46 which are commonly air driven. These units are available in the open market, being commonly termed "nibblers" when used with a fixed anvil die such as that described herein on the anvil 27.

In some plant installations the successive strip lengths are fed in such manner that the hand of the overlap of the seam welded strip is haphazard as indicated in FIGURES 8 and 9. In FIGURE 8 the head end of a new coil of strip is on the bottom while in FIGURE 9 such end is on top. The seam welder will, of course, handle either condition but the shearing unit of my invention must be specially constructed to provide for such interchangeability. This may be accomplished by simply rotating the shear unit through 180° about an axis which is longitudinal with the strip and in the plane thereof. This may also be accomplished, as shown in FIGURE 7, wherein an anvil 27" which corresponds in function to the first described anvil 27 is provided on its top surface with two longitudinal and transversely spaced cutting edges and two of the same on the bottom right and left shear knives 32' and 32" are mounted on a rocker 47 for selective engagement with either of the top cutting edges, and a similar arrangement provided on the bottom for the right and left knives 35' and 35". FIGURES 8 and 9 show the results obtained by this shiftable arrangement.

While we have shown specifically rotating and reciprocating knives to shear the stock, it is conceivable that for certain applications involving thin, soft stock, for example, certain styles of immobile slitting knives may be used for the purpose and we accordingly consider the combinations of such apparatus in fixed advance relation to the seam welding wheels and in combination with the strip clamps to be within the purview of our invention.

It should now be apparent that we have provided an improved method and improved apparatus for joining metal sheet or strip along side or end edges which accomplishes the objects initially set out. Joints may be made in much less time than heretofore required for similar operations, and the apparatus required is much simpler, more compact, and less expensive than prior art apparatus used for the same general purpose. Further, our method and apparatus is more versatile in that it may be employed to effect overlapped mash-welded seams or infinite length. Thus and for example, parallel lengths of strip may be continuously welded together along their side edges to increase the stock width as will be readily understood. To adapt the machine of FIGURE 1 to such use it is only necessary to swing the welding wheels and the shearing and overlapping unit about a vertical axis sufficient to provide running clearance for the stock through the throat of frame 11. Other specific uses and modifications will readily occur to those skilled in the art, and accordingly to the above specifically described embodiments should be considered as illustrative only of the invention, requiring reference to the appended claims in determining the scope of the invention.

We claim:

1. Apparatus for joining metal sheet or strip along overlapped edges thereof comprising a pair of clamps to secure the workpieces in overlapped relation, a combined shearing and welding assembly and means to effect relative movement between said assembly and the work longitudinally along said edges, said assembly being movable between said clamps and comprising means to progressively separate the overlapped edge portions of the workpieces and means movable with said separating means and co-operating therewith to separately shear the said overlapped edge portions of the two pieces making up the work along offset lines and while the workpieces are held in said clamps to thereby provide overlapped portions of the pieces which are edge sheared along spaced parallel lines, and said assembly also comprising a pair of seam welding electrodes positioned adjacent said shearing means and operative to seam weld said sheared overlapped edges of said work-pieces in a progressive manner and closely behind said shearing means.

2. Apparatus according to claim 1 further characterized in that said shear means comprises a cantilevered flat anvil having a tapered free end to enter between the overlapped portions of the workpieces, said anvil carrying an upwardly directed shearing edge and an offset downwardly directed shearing edge, said shear means also comprising upper and lower supports cantilevered parallel with said anvil and each mounting means providing a shearing edge for cooperation with said upwardly and downwardly directed shearing edges to thereby provide means to separately shear upper and lower overlapped metal sheet or strip pieces along offset lines.

3. Apparatus according to claim 2 further characterized in that said anvil is made in two parts separated longitudinally and centrally and with said upwardly directed shearing edge on one part while the downwardly directed shearing edge is on the other part, the arrangement being such that said parts may be mounted in variably spaced relation to each other to thereby vary the extent of overlap of the sheared workpieces.

4. Apparatus according to claim 2 further characterized in that said means mounted on said supports and providing shearing edges comprise rotary shearing knives.

5. Apparatus according to claim 2 further characterized in that said means mounted on said supports and providing shearing edges comprise reciprocating blades and means to reciprocate the blades.

6. Apparatus according to claim 2 further including means mounting said shear means for rotation through 180 degrees about an axis parallel to and centrally disposed to the lines of shear, the arrangement being such that the shear means is operative to shear the workpieces along lines adjacent to their initially overlapped edges and to thus leave said workpieces overlapped after shearing without longitudinally moving said workpieces relative to each other.

7. Apparatus to separately shear overlapped sheet metal workpieces along parallel but offset lines and for leaving the sheared workpieces overlapped while said workpieces are firmly held with respect to each other comprising a support and a flat anvil cantilevered outwardly therefrom and adapted to have longitudinal movement with respect to overlapped sheet metal workpieces wherein said anvil travels between said workpieces, said support extending both above and below the general plane of said overlapped workpieces and being Z-shaped in its vertically intermediate portion, said anvil having laterally offset upwardly and downwardly directed shearing edges, upper and lower supports cantilevered outwardly from said upper and lower portions, respectively, of the first mentioned support, and means carried by said upper and lower supports to provide shearing edges complementary to the first mentioned shearing edges, the arrangement being such that said Z-section permits longitudinal passage of the overlapped shear edges of the workpieces.

8. Apparatus according to claim 7 further including a plow-like surface extending from one side of the top surface of said anvil to said Z-section, a similar plow-like surface extending from the other side of the bottom surface of said anvil, the arrangement being such that said plow-like surfaces curve the strips of metal cut off by said shear means away from opposite sides of the lines of shear.

9. Apparatus according to claim 8 further including seam welding means positioned adjacent said first mentioned support, said welding means being movable with said first mentioned support relative to the work and being operative to weld the overlapped sheared edge portions of the workpieces together as the same pass beyond said Z-section.

10. Apparatus according to claim 1 further including upper and lower camming plates between said shear means and said electrodes and positioned on opposite sides of the latter to guide the overlapped portions of the sheared workpieces into close overlapping relation before said overlapped portions enter between said electrodes.

11. Apparatus according to claim 10 further characterized in that said plates have flat outer surfaces operative to deflect the elongated shear croppings away from contact with said electrodes.

12. Apparatus according to claim 2 further characterized in that said anvil also carries a second upwardly directed shearing edge which is offset both laterally and longitudinally with respect to said first mentioned downwardly directed shearing edge, and further including upper and lower rocker arms mounted on said supports and mounting at one end the said means providing a shearing edge for co-operation with the first mentioned upwardly and downwardly directed shearing edges, the opposite ends of said arms mounting additional shearing edges for co-operation with said second upwardly and downwardly directed shearing edges, the arrangement being such that by shifting said rocker arms said offset lines of shear may be simultaneously effected irrespective of the direction of overlap of the strip pieces.

References Cited by the Examiner

UNITED STATES PATENTS

| | | | |
|---|---|---|---|
| 2,957,071 | 10/1960 | Cooper et al. | 219—82 |
| 3,021,416 | 2/1962 | Mallett et al. | 219—82 |
| 3,102,189 | 8/1963 | Jones et al. | 219—82 |

RICHARD M. WOOD, *Primary Examiner.*